(12) United States Patent
Dupuis

(10) Patent No.: US 12,025,278 B2
(45) Date of Patent: Jul. 2, 2024

(54) FILLING STATION FOR SUPPLYING A PLURALITY OF VEHICLES WITH A GAS CONTAINING HYDROGEN

(71) Applicant: McPhy Energy, La Motte Fanjas (FR)

(72) Inventor: Cédric Dupuis, Romans (FR)

(73) Assignee: McPhy Energy, La Motte Fanjas (FR)

( * ) Notice: Subject to any disclaimer, the term of this patent is extended or adjusted under 35 U.S.C. 154(b) by 130 days.

(21) Appl. No.: 17/440,640

(22) PCT Filed: Mar. 19, 2020

(86) PCT No.: PCT/FR2020/050595
§ 371 (c)(1),
(2) Date: Sep. 17, 2021

(87) PCT Pub. No.: WO2020/193922
PCT Pub. Date: Oct. 1, 2020

(65) Prior Publication Data
US 2022/0154882 A1    May 19, 2022

(30) Foreign Application Priority Data

Mar. 27, 2019  (FR) ........................................ 1903206

(51) Int. Cl.
| | |
|---|---|
| *F17C 5/06* | (2006.01) |
| *C25B 1/04* | (2021.01) |
| *C25B 9/17* | (2021.01) |

(52) U.S. Cl.
CPC .................. *F17C 5/06* (2013.01); *C25B 1/04* (2013.01); *C25B 9/17* (2021.01);
(Continued)

(58) Field of Classification Search
CPC . Y02E 60/32; Y02E 60/36; C25B 1/04; F17C 5/06; F17C 2205/0134;
(Continued)

(56) References Cited

U.S. PATENT DOCUMENTS

| | | | |
|---|---|---|---|
| 6,779,568 B2 | 8/2004 | Borck | |
| 7,624,770 B2 * | 12/2009 | Boyd | ...................... F17C 5/007 141/82 |

(Continued)

FOREIGN PATENT DOCUMENTS

| | | | |
|---|---|---|---|
| CN | 101418907 B | * | 12/2011 |
| CN | 101418907 B | | 12/2011 |

(Continued)

OTHER PUBLICATIONS

CN-101418907-B English Translation of Specification (Year: 2024).*
(Continued)

*Primary Examiner* — Timothy P. Kelly
*Assistant Examiner* — Stephanie A Shrieves
(74) *Attorney, Agent, or Firm* — TraskBritt

(57) ABSTRACT

A filling station for supplying vehicles with gas containing hydrogen comprises: a storage unit comprising high pressure gas containers; a compression unit comprising compressors for increasing the pressure of gas for the storage unit; and a supply unit comprising a supply device for supplying a vehicle; a storage circuit for circulating gas from the compression unit to the storage unit; and a filling circuit for circulating gas from the storage unit to the compression unit. The storage circuit comprises a storage pipe network connecting each compressor to each container and at least one storage distributor for selectively associating the compressors and the containers. The filling circuit includes a filling pipe network connecting each container with each compressor and a filling distributor for selectively associating the containers and the compressors. The station further includes control means for controlling the storage and filling distributors.

20 Claims, 6 Drawing Sheets

(52) U.S. Cl.
CPC .............. *F17C 2201/054* (2013.01); *F17C 2205/0134* (2013.01); *F17C 2205/0352* (2013.01); *F17C 2205/0376* (2013.01); *F17C 2221/012* (2013.01); *F17C 2223/0123* (2013.01); *F17C 2223/035* (2013.01); *F17C 2225/0123* (2013.01); *F17C 2227/0157* (2013.01); *F17C 2227/0185* (2013.01); *F17C 2227/0337* (2013.01); *F17C 2227/0388* (2013.01); *F17C 2227/043* (2013.01); *F17C 2250/032* (2013.01); *F17C 2265/061* (2013.01); *F17C 2265/065* (2013.01); *F17C 2270/0105* (2013.01); *F17C 2270/0171* (2013.01); *F17C 2270/0173* (2013.01); *F17C 2270/0176* (2013.01); *F17C 2270/0178* (2013.01); *F17C 2270/0186* (2013.01)

(58) Field of Classification Search
CPC ...... F17C 2205/0376; F17C 2205/0352; F17C 2227/0157; F17C 2227/0185; F17C 2227/0337; F17C 2227/043; F17C 2250/032; F17C 2265/061; F17C 2265/065; F17C 2205/0146; F17C 2227/0353; F17C 2227/0355; F17C 2265/063
USPC .......................................................... 141/82
See application file for complete search history.

(56) References Cited

U.S. PATENT DOCUMENTS

| | | | | |
|---|---|---|---|---|
| 7,967,036 | B2 * | 6/2011 | Ding | F17C 5/06 141/85 |
| 7,987,877 | B2 * | 8/2011 | Bavarian | F17C 7/00 141/105 |
| 9,618,158 | B2 * | 4/2017 | Killeen | F17D 3/00 |
| 9,856,142 | B2 * | 1/2018 | Louis | C01B 3/50 |
| 10,077,871 | B2 | 9/2018 | Blanchet | |
| 2004/0049982 | A1 * | 3/2004 | Shimizu | B01J 14/005 48/89 |
| 2008/0185068 | A1 | 8/2008 | Cohen et al. | |
| 2009/0151809 | A1 * | 6/2009 | Balasubramanian | F17C 5/06 141/3 |
| 2009/0250138 | A1 | 10/2009 | Bavarian et al. | |
| 2013/0340888 | A1 * | 12/2013 | Nishiumi | F17C 13/026 141/82 |
| 2014/0130938 | A1 | 5/2014 | Luparello | |
| 2014/0352840 | A1 * | 12/2014 | Blanchet | F17C 5/06 141/69 |
| 2016/0169449 | A1 * | 6/2016 | Allidieres | F17C 5/007 141/94 |
| 2016/0281928 | A1 * | 9/2016 | Yoshida | F17C 5/06 |
| 2017/0067600 | A1 * | 3/2017 | Poorman | F17C 5/06 |
| 2017/0102110 | A1 | 4/2017 | Lomax et al. | |
| 2017/0336028 | A1 * | 11/2017 | Cohen | F17C 13/04 |
| 2022/0003361 | A1 * | 1/2022 | Bødker | F17C 5/02 |

FOREIGN PATENT DOCUMENTS

| | | |
|---|---|---|
| CN | 103244825 A | 8/2013 |
| EP | 1146277 A1 | 10/2001 |
| EP | 3249281 A1 | 11/2017 |
| EP | 3249282 A1 | 11/2017 |
| FR | 3033866 B1 | 3/2017 |
| WO | 2009/009745 A1 | 1/2009 |
| WO | 2019/009745 A1 | 1/2019 |
| WO | 2020/147911 A1 | 7/2020 |

OTHER PUBLICATIONS

International Search Report for International Application No. PCT/FR2020/050595 dated Aug. 6, 2020, 3 pages.
International Written Opinion for International Application No. PCT/FR2020/050595 dated Aug. 6, 2020, 6 pages.

* cited by examiner

FILLING STATION FOR SUPPLYING A PLURALITY OF VEHICLES WITH A GAS CONTAINING HYDROGEN

CROSS-REFERENCE TO RELATED APPLICATIONS

This application is a national phase entry under 35 U.S.C. § 371 of International Patent Application PCT/FR2020/050595, filed Mar. 19, 2020, designating the United States of America and published as International Patent Publication WO 2020/193922 A1 on Oct. 1, 2020, which claims the benefit under Article 8 of the Patent Cooperation Treaty to French Patent Application Serial No. 1903206, filed Mar. 27, 2019.

TECHNICAL FIELD

The present disclosure relates to a filling station for supplying a plurality of vehicles with a gas containing hydrogen.

BACKGROUND

The rapid filling with gaseous hydrogen of high-pressure tanks on board hydrogen-powered vehicles is conventionally carried out by successive pressure balances between a plurality of high-pressure containers. This cascade filling is obtained by carrying out a succession of pressure balances between, on the one hand, the vehicle tank and, on the other hand, containers of increasing pressure.

Document US20090151809 discloses a so-called pressure consolidation method for increasing the pressure of one container from the residual pressure of another container. In this document, a compressor used to increase the pressure of gaseous hydrogen originating from a source is also used at the outlet of the containers to increase their residual pressure.

Document EP3249281 also discloses an architecture in which a compressor is placed at the outlet of one container in order to consolidate the pressure of another container. In this architecture, one compressor is dedicated to increasing the pressure of the hydrogen coming from the source, while another compressor is dedicated to consolidating the pressure.

The constant increase in the fleet of hydrogen-powered vehicles and its diversification into modes of transport other than automobiles, such as trucks, buses or even ships, necessitates a station architecture that can meet increasingly variable and substantial demands for power.

The architectures presented in the state of the art, although capable of delivering the filling of a tank in a short time (a few minutes), do not have the adequate versatility and modularity to meet all these needs.

In addition, these architectures do not have the robustness making it possible to guarantee a satisfactory and uninterrupted response if one of the components of the station fails, in particular, the compressor or the container.

BRIEF SUMMARY

The present disclosure aims to overcome at least part of the aforementioned drawbacks of the state of the art, by proposing a filling station architecture that is scalable, versatile, and adaptable to a wide variety of needs.

To do this, the present disclosure provides a filling station for supplying a plurality of vehicles with a gas containing hydrogen originating from a source and comprising:
- a storage unit comprising a plurality of containers for storing gas at high pressure;
- a compression unit comprising a plurality of compressors for increasing the pressure of the gas intended for the storage unit;
- a supply unit comprising at least one supply device intended to supply a vehicle of the plurality of vehicles.

The present disclosure is remarkable in that it further comprises:
- a storage circuit for circulating the gas from the compression unit to the storage unit, the storage circuit comprising a network of storage pipes connecting each compressor of the compression unit to each container of the storage unit and at least one storage distributor for selectively associating the compressors and the containers;
- a filling circuit for circulating the gas from the storage unit to the compression unit, the filling circuit comprising a network of filling pipes connecting each container of the storage unit with each compressor of the compression unit and at least one filling distributor for selectively associating the containers and the compressors;
- control means for controlling the storage and filling distributors.

A filling station according to the present disclosure has the advantage, unlike the state of the art, of having a plurality of components inside each unit. The size of each unit can easily be adapted to the scale of the needs of the station by adding or removing components.

According to other advantageous and non-limiting features of the present disclosure, taken alone or in any technically feasible combination:
- the supply unit comprises a plurality of supply devices;
- the filling station also comprises a supply circuit for circulating the gas from the storage unit to the supply unit, the supply circuit comprising a network of supply pipes connecting each container of the storage unit to each supply device of the supply unit and at least one supply distributor for selectively associating the containers and the supply devices, the control means also being for controlling the supply distributor;
- the filling station further comprises a cooling unit comprising at least one cooler for reducing the temperature of the gas;
- the cooling unit comprises a plurality of coolers;
- the filling station also comprises a cooling circuit for circulating the gas from the supply unit to the cooling unit, the cooling circuit comprising a network of cooling pipes connecting each supply device in the supply unit to each cooler in the cooling unit and at least one cooling distributor for selectively associating the containers and the supply devices, the control means also being for controlling the cooling distributor;
- the filling station also comprises a cooling circuit for circulating the gas from the storage unit to the cooling unit, the cooling circuit comprising a network of cooling pipes connecting each container in the storage unit to each cooler in the cooling unit and at least one cooling distributor for selectively associating the containers and the coolers, the control means also being for controlling the cooling distributor;
- the filling station also comprises a supply circuit for circulating the gas from the storage unit to the supply unit, the supply circuit comprising a network of supply pipes connecting each container of the storage unit to each supply device of the supply unit and at least one supply distributor for selectively associating the coolers and the supply devices, the control means also being for controlling the supply distributor;

the filling station further comprises a supply unit, comprising at least one gas supply unit, and forming the source from which the gas originates;

the supply unit comprises a plurality of gas supply units and the filling station comprises a compression circuit for circulating gas from the supply unit to the compression unit, the compression circuit comprising a network of compression pipes connecting each gas supply unit of the supply unit to each compressor of the compression unit and at least one compression distributor for selectively associating the gas supply units and the compressors, the control means also being for controlling the compression distributor;

at least one gas supply unit of the supply unit is a stationary or mobile hydrogen production unit;

the hydrogen production unit is an electrolyzer;

at least one gas supply unit of the supply unit is a mobile storage unit;

the filling station comprises at least one other container, separate from the plurality of containers of the storage unit, the other container not being systematically connected to each compressor of the plurality of compressors of the compression unit;

the filling station comprises at least one other compressor, separate from the plurality of compressors of the compression unit, the other compressor not being systematically connected to each container of the plurality of containers of the storage unit.

BRIEF DESCRIPTION OF THE DRAWINGS

Other advantages and particularities of the present disclosure will become apparent on reading the detailed description of implementations and embodiments, which are in no way limiting, with regard to the accompanying drawings in which.

DETAILED DESCRIPTION

For the sake of simplifying the following description, the same reference signs are used for elements that are identical or perform the same function in the different embodiments of the present disclosure.

Figure 1:
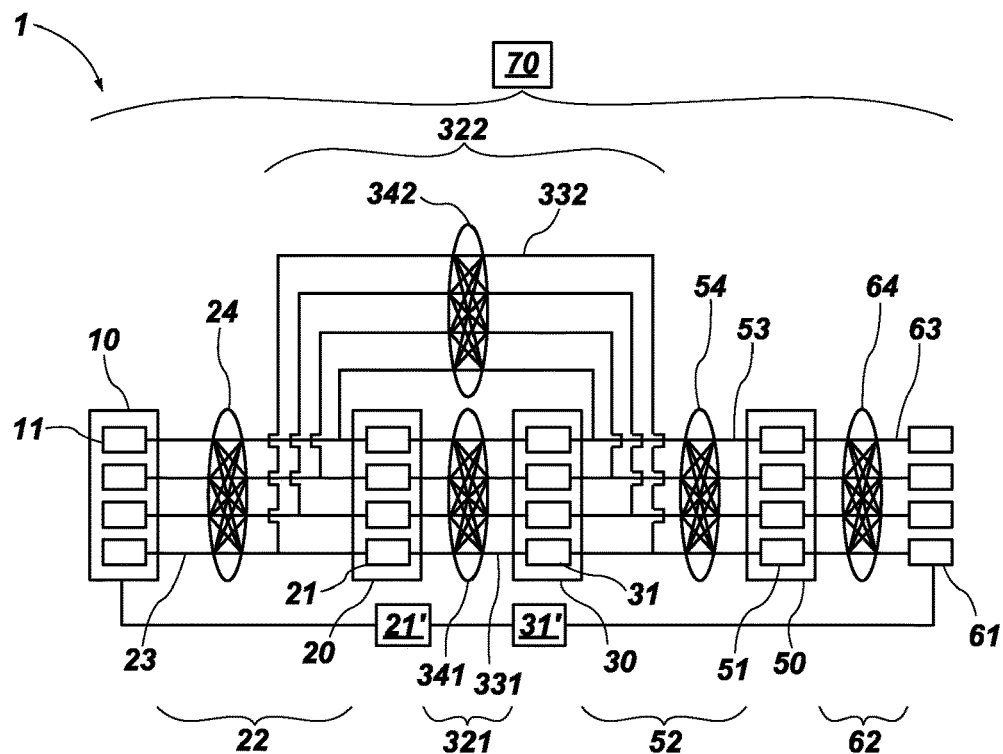
FIG. 1 shows a schematic view illustrating the structure of a filling station according to a first embodiment of the present disclosure.
Figure 2:
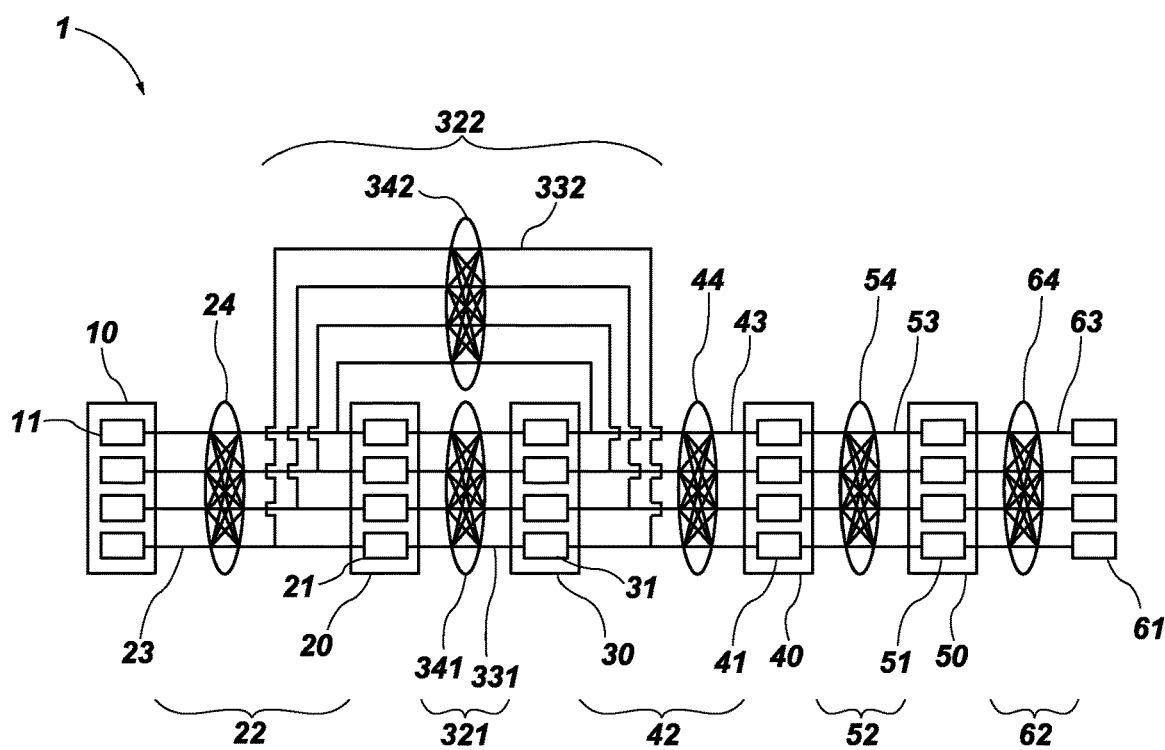
FIG. 2 shows a schematic view illustrating the structure of a filling station according to a second embodiment of the present disclosure.
Figure 3:
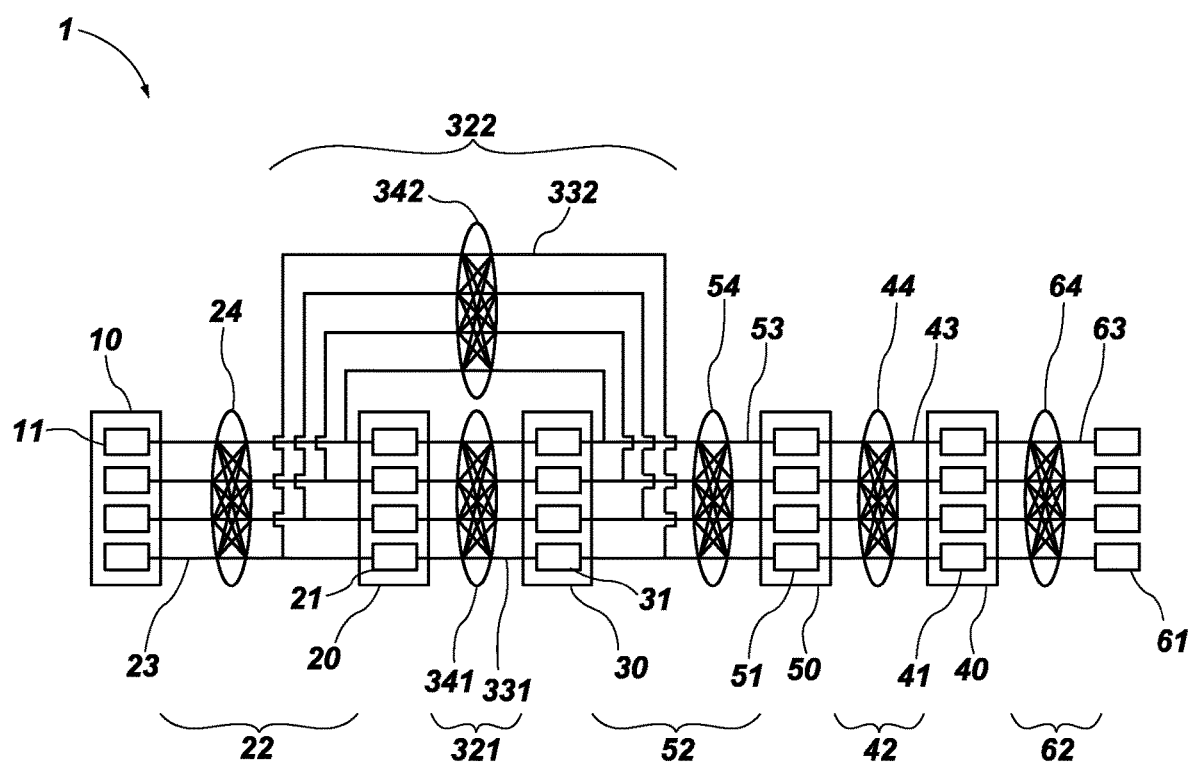
FIG. 3 shows a schematic view illustrating the structure of a filling station according to a third embodiment of the present disclosure.

FIGS. 1 to 3 show architectures of a filling station 1 in accordance with the present disclosure.

Such a filling station 1 is intended to supply a plurality of vehicles 61 with gas containing hydrogen originating from a source. The vehicles 61 can, in particular, be land vehicles such as cars, buses, trucks or trains, but can also be maritime vehicles such as ships or air vehicles, such as airships. The gas can be pure dihydrogen, or a gas mixture comprising dihydrogen such as a natural gas-dihydrogen mixture, for example, comprising at least 5% dihydrogen, and preferably at least 20% dihydrogen.

To this end, a filling station 1 in accordance with the present disclosure may comprise a supply unit 10 comprising at least one gas supply unit 11 and forming the source from which the gas originates.

The source can be a hydrogen production unit, which can be fixed or mobile. In particular, the source can be an electrolyzer, then making it possible to produce hydrogen gas in situ by electrolysis of water. Advantageously, and in a nonlimiting manner, the electrolyzer is a high-capacity electrolyzer, capable of generating from 10 to 1000 $Nm^3/h$, to supply the filling station with gas at medium pressure. The term "gas at medium pressure" is understood to mean a gas having a pressure of between 50 mbar and 60 bar. Preferably, the electrolyzer supplies the filling station with gas having a pressure of between 10 and 30 bar, or even a pressure equal to 30 bar.

Alternatively, the source can be a simple mobile gas storage unit, such as a portable tank or a cylinder. Such a tank can be placed on any means of transport such as a truck, a train or even a boat to convey gas from an external production source to the station.

The mobile gas storage unit can then contain gas at medium or high pressure. The term "gas at high pressure" is understood to mean a gas having a pressure greater than 60 bar, for example, 200, 350, 500 or 1000 bar.

Advantageously, the supply unit 10 comprises a plurality of gas supply units 11.

However, the present disclosure is in no way limited to such configurations. A filling station according to the present disclosure can also be supplied in part by an external hydrogen production source, via gas transport means external to the station such as trailers or by a gas pipeline. The filling station may also not comprise a gas supply unit 11 and be supplied exclusively by such an external source.

Whatever the configuration of the source, and continuing the description of FIG. 1, a filling station 1 in accordance with the present disclosure comprises a storage unit 30 comprising a plurality of containers 31 for storing the gas at high pressure.

Advantageously, and in a non-limiting manner, each container 31 of the storage unit 30 is able to store gas at a pressure greater than 200 bar, preferably at a maximum pressure of 500 bar or even 1000 bar. Each container 31 can contain a volume of gas at high pressure greater than 10 L, preferably between 5 and 50 m³.

A container can consist of one or more storage cylinders.

In a particularly advantageous manner, the storage unit 30 comprises at least four containers 31, or even at least five containers 31 or more.

The presence of a plurality of containers 31 makes it possible, in particular, to carry out successive pressure balances, for example, to carry out cascade fillings as defined in the introduction.

The filling station 1 further comprises a compression unit 20 comprising a plurality of compressors 21 for increasing the pressure of the gas intended for the storage unit 30.

Each compressor 21 typically makes it possible to increase the pressure of the gas from a pressure preferably between 10 and 30 bar to a pressure that can range up to 500 bar, or even up to 1000 bar, in order to supply a container 31 with gas at high pressure.

Advantageously, the compression unit 20 comprises at least four compressors 21, or even at least five compressors 21 or more.

Of course, and although FIGS. 1 to 3 show a compression unit 20 and a storage unit 30 each comprising four components, this number is in no way limiting. Each unit can also contain a different number of components.

The filling station also comprises a storage circuit 321 for circulating the gas from the compression unit 20 to the storage unit 30. The storage circuit 321 comprises a network of storage pipes 331 connecting each compressor 21 of the compression unit 20 to each container 31 of the storage unit 30. The storage circuit 321 also comprises at least one storage distributor 341 for selectively associating the compressors 21 and the containers 31.

For example, the storage distributor 341 may be a valve arranged on a storage pipe 331 and allowing the storage pipe 331 to be opened or closed. In this case, a valve can be placed on each storage pipe 331.

Alternatively, the storage distributor 341 can be a valve with several positions, able to perform any combination of opening and closing of each storage pipe 331.

Regardless of the type of storage distributor 341, a filling station 1 according to the present disclosure further comprises control means for controlling the storage distributor(s) 341.

The control means can be configured to actuate the closing and/or opening of each storage pipe 331 of the storage pipe network 331 either on instructions from an operator, or according to preconfigured conditions. To this end, the control means can comprise a computer configured beforehand to carry out these operations. This computer can be integrated into a control unit of the station 1.

The storage circuit 321 thus makes it possible to supply the plurality of containers 31 with gas at high pressure, preferably on the order of 400 to 500 bar, or even 700 bar to 1000 bar. The storage distributors 341 make it possible to select at any time, according to predetermined conditions, the compressor(s) 21 used to supply a given container 31, as well as the container(s) 31 to be supplied with gas at high pressure.

A filling station 1 according to the present disclosure also comprises a filling circuit 322 for circulating the gas from the storage unit 30 to the compression unit 20. To this end, the filling circuit 322 comprises a network of filling pipes 332 connecting each container 31 of the storage unit 30 to each compressor 21 of the storage unit 30. The filling circuit 322 further comprises at least one filling distributor 342 for selectively associating the containers 31 and the compressors 21.

The filling distributors 342 can be similar to the storage distributors 341 described above.

Regardless of the type of filling distributor 342, the control means are also configured to control the filling distributor(s) 342.

The filling circuit 322 thus makes it possible to achieve pressure consolidation, that is to say, to circulate gas from a given container 31 to one or more compressors 21, which then increase(s) the pressure of the received gas to again supply one or more containers 31 through the storage circuit 321. The filling distributors 342 make it possible to select, at any time, the containers 31 and the compressors 21 to be used to carry out the pressure consolidation.

In this way, a filling station 1 in accordance with the present disclosure makes it possible to reconfigure, dynamically and as the need arises, the association of the compressors 21 of the compression unit 20 with the containers 31 of the storage unit 30.

First, this possibility of reconfiguration makes it possible to change the use of each compressor 21 of the compression unit 20 as required. Such an advantage is explained, in particular, in the example developed in the remainder of this description.

Such a possibility also makes it possible to increase the redundancy of the equipment making up the station 1. Redundancy is understood to mean having several copies of the same equipment in order to increase the total capacity or the performance of a system and/or to reduce the risk of failure. The increase in redundancy makes it possible to improve the reliability of a station, but conventionally requires the number of each copy to be multiplied. Thus, for each functional component, a second identical component is generally provided that only ensures redundancy. The possibility of reconfiguration offered by the present disclosure allows several components to be able to participate in the same mechanical solution, thereby increasing redundancy. However, since the same component can be dynamically allocated to one function or another, it is possible to increase the redundancy of the equipment making up the station 1 without doubling the number of components necessary to ensure this redundancy.

A station 1 in accordance with the present disclosure thus has the advantage of having greater reliability than a station whereof each component would have a dedicated functionality, each component of a unit being able to be used in addition to or in replacement of another.

In particular, the possibility of dynamic reconfiguration offered by such a station makes it possible to ensure the continuity of the station's activity even when maintenance is necessary. This may be preventive maintenance, that is to say, a need for maintenance of a component before it is deteriorated, or curative maintenance, that is to say, the failure of a component.

Thus, if one of the components is unavailable, the control means of the corresponding unit can reconfigure the corresponding circuit and control the distributors to overcome the deficiency of the unavailable component by adjusting the operation of the other components of the unit as needed.

Of course, a filling station 1 according to the present disclosure can also comprise containers 31 and compressors 21 not belonging to the units described above. In particular, the station may comprise at least one other container 31', separate from the plurality of containers 31 of the storage unit 30, the other container 31' not necessarily being fluidly connectable to all the other compressors 21 comprised in the station 1, and, in particular, to each compressor 21 of the plurality of compressors 21 of the compression unit 20. Likewise, the station 1 can comprise at least one other compressor 21', separate from the plurality of compressors 21 of the compression unit 20, the other compressor 21' not being fluidly connectable to all the other containers comprised in the station 1, and, in particular, to each container 31 of the plurality of containers 31 of the storage unit 30.

The volume of the containers can be chosen freely, and is in no way limited to specific volumes.

In particular, at least one other container can be provided to contain a smaller volume of gas than those mentioned above, for example, on the order of 1 L. Such volumes can, in particular, be used in the context of filling methods said to be by direct compression, as opposed to cascade filling. In the context of this method, gas, generally originating from a container of the storage unit or directly from the supply unit 10, circulates to a compressor. The compressor increases the pressure of the gas and circulates it through the low-volume container to the vehicle's tank in order to supply it. The tank is thus supplied as the compressor operates.

Such a method has the advantage of not requiring a container capable of storing gas at pressures greater than 500 bar. The gas compressed by the compressor directly supplies the vehicle's tank by circulating temporarily through the low-volume container, the purpose of which is to smooth the pressure level at the outlet of the compressor. For this purpose, such a container can consist of one or more cylinders, but it can also simply be a pipe of suitable diameter and length.

This method also has the advantage over cascade filling of not creating heating in the tank during filling of the tank by the effect of the quasi-adiabatic expansion described in the remainder of the description.

Returning to the description of FIGS. 1 to 3, at least some of the compressors 21 of the compression unit 20 are connected to the source.

The filling station 1 also comprises a compression circuit 22 for circulating the gas from the supply unit 10 to the compression unit 20.

In the case where the filling station 1 comprises a supply unit 10 comprising a plurality of gas supply units 11, the compression circuit 22 comprises a network of compression pipes 23 connecting each gas supply unit 11 to each compressor 21 of the compression unit 20. The compression circuit 22 further comprises at least one compression distributor 24 for selectively associating the gas supply units 11 with the compressors 21.

The compression distributors 24 can be similar to the storage distributors 341 described above.

Regardless of the type of compression distributor 24, the control means are also configured to control the compression distributor(s) 24.

In this way, the filling station 1 also makes it possible to dynamically reconfigure, as required, the quantity of gas originating from the source in order to supply the storage unit 30 via the compression unit 20.

Returning to the description of FIGS. 1 to 3, a filling station 1 according to the present disclosure also comprises a supply unit 50 comprising at least one supply device 51 that is intended to supply a vehicle 61 of the plurality of vehicles 61 to be supplied.

In the context of the present description, the term "supply device 51" is understood to mean a means making it possible to regulate the rise in pressure of the tank of the vehicle 61, that is to say, to manage the speed at which the vehicle 61 is supplied with gas.

Such regulation is necessary in order to avoid excessive heating of the tank of the vehicle 61 in the event of an excessively rapid supply. In fact, the supply of a gas tank is effected by the well-known phenomenon of pressure balancing between a volume containing gas at high pressure, that coming from the containers 31, and a volume at lower pressure, that of the tank, which typically has a vacuum pressure of 50 bar. The increase in pressure in the tank, which forms a quasi-adiabatic compression due to the rapidity of the compression, induces an increase in temperature. Also added to this phenomenon is that of quasi-adiabatic expansion due to pressure drops in the pipes up to the inlet of the tank. It is also called the Joule-Thomson effect and can induce an increase in temperature under certain temperature and pressure conditions, especially for hydrogen. If these temperature increases are not controlled, they are likely to exceed the thermal resistance of the tank, which is generally around 85° C. This excess leads to a risk of damaging the tank.

Conversely, an excessively slow supply eliminates the important advantage of hydrogen-powered vehicles 61, namely their rapid filling, typically in less than five minutes, compared to vehicles having another energy source.

For example, a supply device 51 can comprise a computing device preconfigured to deliver a regulation command and to control the supply rate of a vehicle 61. This computing device can also be integrated into the control unit of the station 1.

Advantageously, the supply unit 50 comprises a plurality of supply devices 51 in order to be able to simultaneously serve a plurality of vehicles 61.

According to a first embodiment, shown in FIG. 1, the filling station 1 also comprises a supply circuit 52 for circulating the gas from the storage unit 30 to the supply unit 50.

If the supply unit 50 comprises a plurality of supply devices 51, the supply circuit 52 comprises a network of supply pipes 53 connecting each container 31 of the storage unit 30 to each supply device 51 of the supply unit 50. The supply circuit 52 further comprises at least one supply distributor 54 for selectively associating the containers 31 and the supply devices 51.

The supply distributors 54 may be similar to the storage distributors 341 previously described.

Whatever the type of supply distributor 54, the control means are also configured to control the supply distributor(s) 54.

In this first embodiment, the filling station 1 also comprises a filling circuit 62, located downstream of the supply unit 50 to fill the vehicles to be supplied with the gas originating from the supply unit 50, according to the regulation imposed by the latter. The filling circuit 62 comprises a network of filling pipes 63 connecting each supply device 51 to a filling means for filling a vehicle 61, such as a filling gun.

The station 1 thus comprises a plurality of filling means, each filling means being connected to each supply device 51 of the supply unit 50 via the filling circuit 62, in order to be able to independently fill the tank of each vehicle 61 of the plurality of vehicles 61 to be supplied.

The filling circuit 62 further comprises at least one filling distributor 64 for selectively associating the supply devices 51 and the filling means.

The filling distributors 64 can be similar to the storage distributors 341 described above.

Regardless of the type of filling distributor 64, the control means are also configured to control the filling distributor(s) 64.

According to a second embodiment, shown in FIG. 2, the filling station 1 further comprises a cooling unit 40 upstream of the supply unit 50, comprising at least one cooler 41 for reducing the temperature of the gas originating from the storage unit 30. The cooling unit 40 is thus located between the storage unit 30 and the supply unit 50, the gas originating from the storage unit 30 then circulating through the cooling unit 40 before reaching the supply unit 50.

The term "cooler" is understood in the present description to refer to a means for reducing the temperature of the gas circulating in a pipe.

The structure of the cooler 41 is well known per se, and can typically comprise a buffer tank intended to store and regulate a coolant, for example, liquid nitrogen, as well as an electrical management system that can be connected to the control unit of the station 1.

Cooling the gas makes it possible to reduce its initial temperature before its delivery into the tank of the vehicle 61 leads to an increase in the temperature. In this way, it is possible to control this increase in temperature in order to reach a temperature the tank can withstand at the end of filling thereof.

Typically, in the case of filling a car with hydrogen, cooling the hydrogen to an initial temperature of −40° C. makes it possible to bring it to a temperature in the tank close to ambient temperature, or at least lower than the thermal resistance of the tank, after filling for 3 to 5 minutes. Cooling the gas therefore makes it possible to accelerate the filling of the tank without risking its deterioration.

Of course, the present disclosure is in no way limited to the type of cooler 41 presented, and can comprise any means making it possible to reduce the temperature of the gas coming from the storage unit 30.

The filling station 1 also comprises a cooling circuit 42 for circulating the gas from the storage unit 30 to the cooling unit 40.

Preferably, the cooling unit 40 comprises a plurality of coolers 41. In this case, the cooling circuit 42 comprises a network of cooling pipes 43 connecting each container 31 of the storage unit 30 to each cooler 41 of the cooling unit 40. The cooling circuit 42 further comprises at least one cooling distributor 44 for selectively associating the containers 31 and the coolers 41.

The cooling distributors 44 can be similar to the storage distributors 341 described above.

Regardless of the type of cooling distributor 44, the control means are also configured to control the cooling distributor(s) 44.

In this second embodiment, the filling station 1 also comprises a supply circuit 52 for circulating the gas from the cooling unit 40 to the supply unit 50. If the station 1 comprises a plurality of supply devices 51, the supply circuit 52 comprises a network of feed pipes 53 connecting each cooler 41 of the cooling unit 40 to each supply device 51 of the supply unit 50. The supply circuit 52 also comprises at least one supply device 51 for selectively associating the coolers 41 and the supply devices 51.

The supply distributors 54 may be similar to the storage distributors 341 previously described.

Whatever the type of supply distributor 54, the control means are also configured to control the supply distributor(s) 54.

The filling circuit 62 as well as the filling means can then be identical to those described in the first embodiment.

According to a third embodiment, shown in FIG. 3, the cooling unit 40 is located downstream of the supply unit 50, and comprises at least one cooler 41 for reducing the temperature of the gas originating from the supply unit 50. The cooling unit 40 is thus located between the supply unit 50 and the plurality of vehicles 61 to be supplied. The gas originating from the supply unit 50 then circulates in the cooling unit 40 to be cooled there before supplying the vehicles 61.

In this embodiment, the supply circuit 52 can be identical to that presented in the first embodiment.

Preferably, the cooling unit 40 comprises a plurality of coolers 41. In this case, the filling station comprises a cooling circuit 42 for circulating gas from the supply unit 50 to the cooling unit 40. The cooling circuit 42 comprises a network of cooling pipes 43 connecting each supply device 51 of the supply unit 50 to each cooler 41 of the cooling unit 40. The cooling circuit 42 further comprises at least one cooling distributor 44 for selectively associating the supply devices 51 and the coolers 41.

The cooling distributors 44 can be similar to the storage distributors 341 described above.

Regardless of the type of cooling distributor 44, the control means are also configured to control the cooling distributor(s) 44.

In this third embodiment, the filling station also comprises a filling circuit 62, located downstream of the cooling unit 40 to fill the vehicles to be supplied with the gas cooled in the cooling unit 40, according to the regulation imposed by the supply unit 50 located upstream. The filling circuit 62 comprises a network of filling pipes 63 connecting each supply device 51 to a filling means that may be similar to that described in the first embodiment.

The station 1 thus comprises a plurality of filling means, each filling means being connected to each cooler 41 of the cooling unit 40 via the filling circuit 62, in order to be able to independently fill the tank of each vehicle 61 of the plurality of vehicles 61 to be supplied.

The filling circuit 62 further comprises at least one filling distributor 64 for selectively associating the supply devices 51 and the filling means.

The filling distributors 64 can be similar to the storage distributors 341 described above.

Regardless of the type of filling distributor 64, the control means are also configured to control the filling distributor(s) 64.

Counterexample

A filling station according to a counterexample not in accordance with the present disclosure is supplied with hydrogen by a source having a maximum flow rate of 86 kg/h, i.e., a maximum of 2000 kg/day. A fleet of one hundred buses requiring an average of 20 kg per fill with a target final pressure of 405 bar constitutes the plurality of vehicles to be supplied. In this counterexample, the station comprises six supply devices, five compressors, as well as four 450 bar containers with a respective volume of 41, 20, 20 and 7 m³. The station also comprises a container located directly at the outlet of the source, intended to collect the medium-pressure gas produced by the latter, and to supply it to the compressors. For the sake of simplicity, no cooling unit has been provided.

In this counterexample, the station comprises a supply device unit made up of the six supply devices, a storage unit made up of the four containers, a first compression unit comprising three compressors dedicated to compressing the gas originating from the source and intended for the storage unit, as well as a second compression unit comprising two compressors dedicated to pressure consolidation, that is to say, to compressing the gas originating from the storage unit and intended for the storage unit.

Figure 4A:
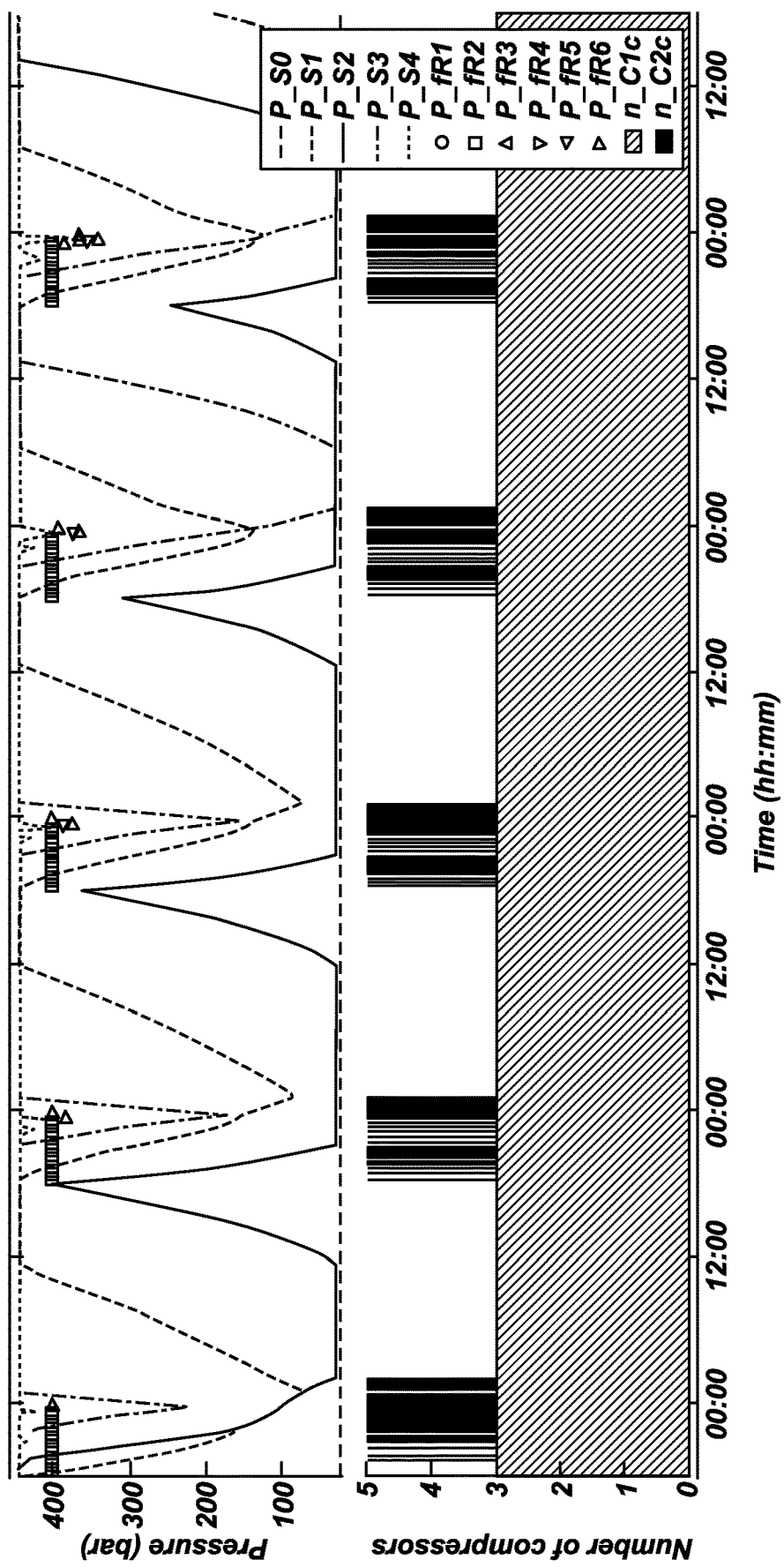
FIG. 4a shows a timing diagram of the evolution of the final pressure delivered by the supply devices, the pressure of the gas stored in the containers and a timing diagram of the evolution of the number and the function of the compressors of a station during five days according to a counterexample not in accordance with the present disclosure.

FIG. 4a shows two timing diagrams. The first one (located at the top of the figure) illustrates the evolution of the final pressure delivered by each of the six supply devices (denoted P_fR1 to P_fR6), as well as the pressure of each container (P_S0 to P_S4). The second one (located at the bottom of the figure) illustrates the evolution over time of the use of each compressor. n_C1c represents the number of operating compressors used to compress the gas originating from the source, while n_C2c represents the number of operating compressors used for pressure consolidation. The results over five days of station operation are shown in FIG. 4a. The x-axis represents time (in hh:mm).

It can be seen that the three compressors of the first compression unit operate continuously to compress the gas originating from the source (n_C1c). Conversely, the two compressors of the second compression unit operate intermittently, and simultaneously during the five days, to ensure pressure consolidation (n_C2c).

It will also be noted that over the days, the station fails to keep the final pressure delivered by the supply devices at the expected level. Indeed, one can see that the points P_fR1 to P_fR6, which designate the final pressure respectively reached by the six supply devices, and which actually all reach the pressure of 405 bar at the end of the first day, decrease over the days, are no longer all grouped together at a value of 405 bar as of the second day, several vehicles being filled at a pressure of less than 400 bar. It is then observed that this phenomenon is accentuated over the following days.

This phenomenon is to be compared with the pressure actually reached inside each container of the storage unit. It can be seen that the maximum pressure in the second container (P_S2) decreases day by day, going from 450 bar at the start of the first day to 400 bar at the end of the first day, then to 350 bar at the end of the second day, and 250 bar at the end of the third day.

Figure 4B:
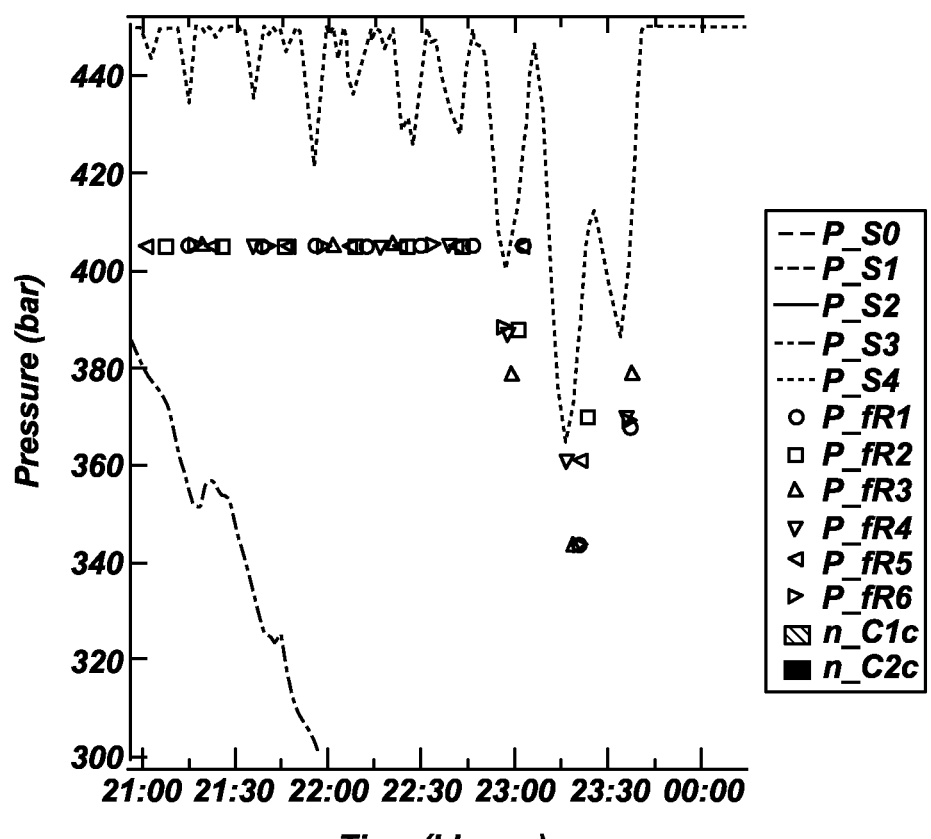
FIG. 4b shows a timing diagram of the evolution of the final pressure delivered by the supply devices, the pressure of the gas stored in the containers during the fifth day according to a counterexample not in accordance with the present disclosure.

FIG. 4b is an enlargement of the first timing diagram of FIG. 4a, centered around the end of the fifth day. This expansion highlights the inability of the station to fill all the tanks at a pressure of 405 bar. It can be seen that from the time 23:00, the final pressure reached by the six supply devices (P_fR1 to P_fR6) no longer reaches 405 bar, the minimum reaching 340 bar, for the supply devices referenced P_fR1, P_fR3 and P_fR6.

Thus, the fixed distribution of the operation of each compression unit is not satisfactory for maintaining a maximum pressure of the containers of the storage unit. This causes a decrease in the maximum pressure delivered by the supply devices of the supply unit over time.

In such a configuration, the station is therefore not able to satisfy the request described above.

EXAMPLE

In an embodiment according to the present disclosure, the filling station comprises components similar to those presented in the counterexample. The supply of the source is identical, as are the needs of the vehicle fleet. The station also comprises six supply devices, five compressors and four containers identical to those presented above, as well as the medium-pressure container directly placed at the outlet of the source.

Conversely, the station here comprises a single compression unit, connected to the storage unit in accordance with the present description. In other words, here, each unit of the station is fully and dynamically reconfigurable, and each compressor can alternatively not operate, operate to compress the gas originating from the source, or operate in pressure consolidation.

Figure 5A:
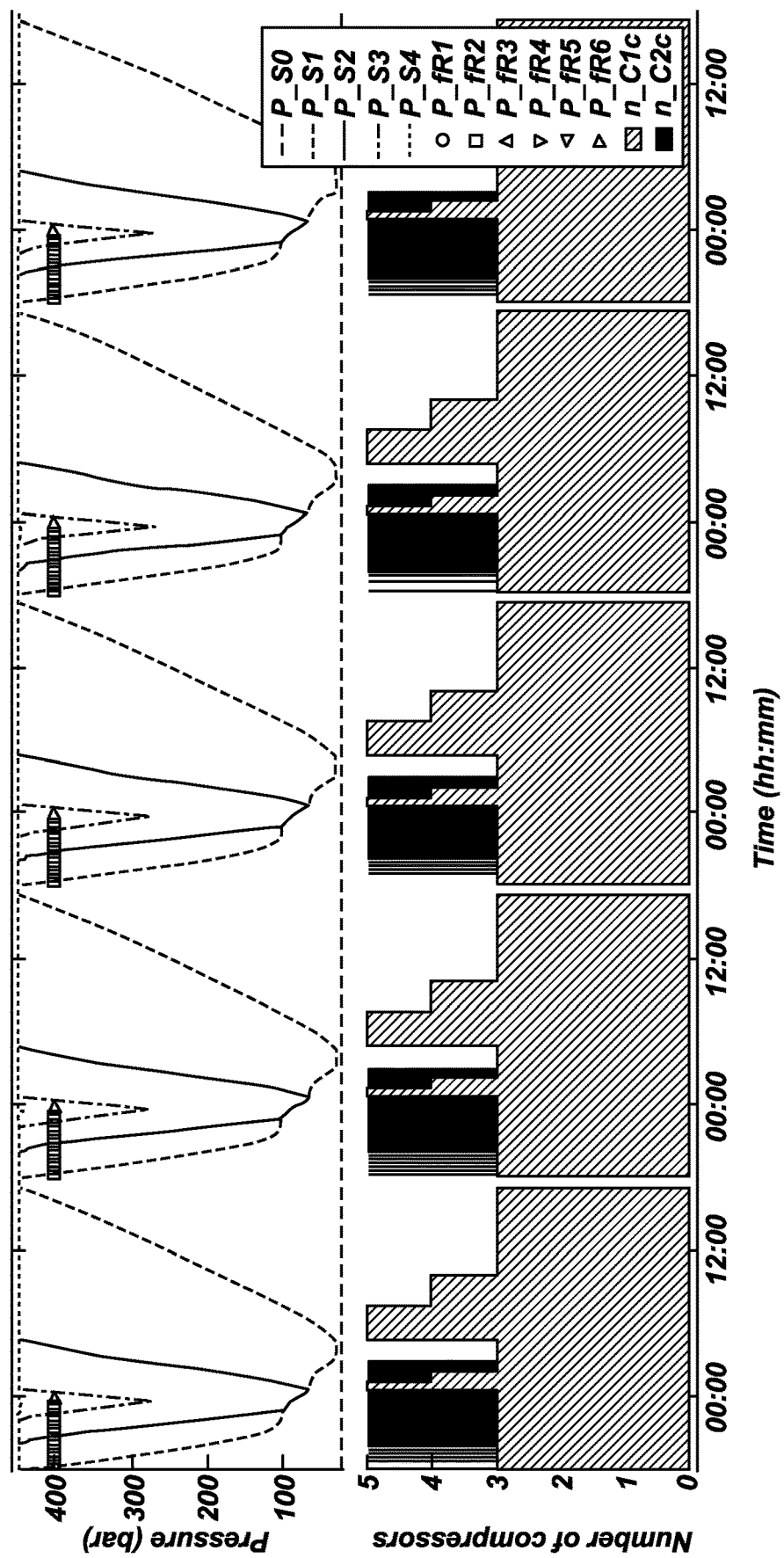
FIG. 5a shows a timing diagram of the evolution of the final pressure delivered by the supply devices, the pressure of the gas stored in the containers and a timing diagram of the number and the function of the compressors of a station during five days according to an example in accordance with the present disclosure.

FIG. 5a shows two timing diagrams showing the evolution of the same quantities as those presented in the counterexample, in particular, in FIG. 4a.

Regarding the operation of the compressors, it will be noted that providing all five compressors both for the compression of the gas originating from the source and for the pressure consolidation allows three compressors to operate constantly for the compression of the gas originating from the source (n_C1c), while the use of the other two compressors changes over time. In fact, in a first period of time, neither of the two compressors is in operation. In a second period of time, both compressors are used for pressure consolidation (n_C2c). In a third period of time, the two compressors are used to compress the gas originating from the source (n_C1c). In a fourth period of time, one of the two compressors is used for pressure consolidation (n_C2c), while the other is used to compress the gas originating from the source (n_C1c). There is also a fourth period of time during which one of the two compressors is used to compress the gas originating from the source (n_C1c), while the other is not in operation. The succession and duration of these periods of time are quite variable and depend on the needs of the station.

Figure 5B:
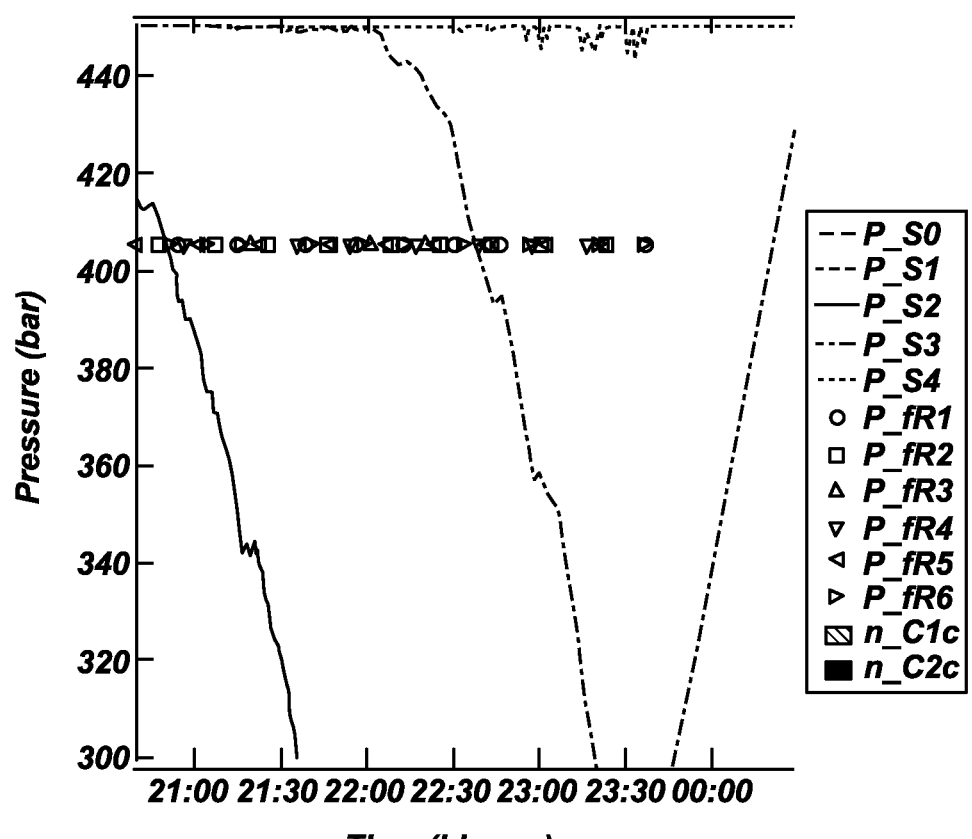
FIG. 5b shows a timing diagram of the evolution of the final pressure delivered by the supply devices, the pressure of the gas stored in the containers during the fifth day according to an example in accordance with the present disclosure.

In terms of the pressure delivered by the supply devices, although the number of components making up the station, the gas supply by the source and the needs of the vehicle fleet are identical, it is noted that the possibility of dynamically reconfiguring the various units and circuits constituting the station makes it possible to maintain a delivery of a final pressure corresponding to the needs of the vehicle fleet. Indeed, it has been noted that the points P_fR1 to P_fR6, which each correspond to the final pressure delivered to a vehicle by one of the six supply devices, are all at the expected pressure of 405 bar, during the three consecutive days. This observation is particularly visible in FIG. 5b, which shows an enlargement of the first timing diagram of FIG. 5a.

Thus, while the inability to sufficiently supply the fleet of vehicles is repeated and intensified in a configuration comprising units dedicated to a particular operation, the possibility offered by the present disclosure to perform a dynamic reconfiguration in the association of the various units makes it possible, under identical conditions, to satisfy demand on a long-term basis.

Likewise, while the counterexample showed the impossibility of reaching the maximum pressure level of the container each day, represented by the curve P_S2, the same container in the station presented in this example reaches its maximum pressure of 450 bar each day.

Of course, the present disclosure is not limited to the embodiments described and it is possible to add variants without departing from the scope of the invention as defined by the claims.

Thus, although coolers 41 and supply devices 51 have been mentioned respectively belonging to the cooling unit 40 and to the supply unit 50, the station can also comprise coolers 41 and supply devices 51 that do not belong to the units that have been described. In particular, the station may comprise at least one other cooler, separate from the plurality of coolers 41 of the cooling unit 40, the other coolers 41 not being systematically connected to the cooling, supply and/or filling circuits previously described. Likewise, the station can comprise at least one other supply device, separate from the plurality of supply devices 51 of the supply unit 50.

In addition, it is also possible that at least one supply device or cooler, which may or may not be of the supply unit 50 or cooling unit 40, is connected directly to a gas supply unit 11. This gas supply unit 11 may be fixed or mobile, and may belong to the supply unit 10, or may be another gas supply unit 11, separate from the supply unit 10, or else a gas supply unit 11 outside the station. In this case, the gas originating from the gas supply unit 11 may not flow through the storage unit 30 and/or the compression unit 20.

Likewise, the various circuits presented may also comprise additional components, such as compressors 21 or coolers 41, which may or may not belong to the compression unit 20 and cooling units 40.

The invention claimed is:

1. A filling station for supplying a plurality of vehicles with a gas containing hydrogen originating from a source, the filing station comprising:
   a storage unit comprising a plurality of containers for storing gas at high pressure;
   a compression unit comprising a plurality of compressors for increasing the pressure of the gas intended for the storage unit;
   a supply unit comprising at least one supply device for supplying a vehicle of the plurality of vehicles;
   a storage circuit for circulating the gas from the compression unit to the storage unit, the storage circuit comprising a network of storage pipes connecting each compressor of the compression unit to each container of the storage unit and at least one storage distributor for selectively and independently associating each of the compressors with each of the containers;
   a filling circuit for circulating the gas from the storage unit to the compression unit, the filling circuit comprising a network of filling pipes connecting each container of the storage unit with each compressor of the compression unit and at least one filling distributor for selectively and independently associating each of the containers with each of the compressors; and
   a control device configured to control the at least one storage distributor and the at least one filling distributor.

2. The filling station of claim 1, wherein the supply unit comprises a plurality of supply devices.

3. The filling station of claim 2, further comprising a supply circuit for circulating the gas from the storage unit to the supply unit, the supply circuit comprising a network of supply pipes connecting each container of the storage unit to each supply device of the supply unit and at least one supply distributor for selectively associating the containers and the supply devices, the control device being further configured for controlling the supply distributor.

4. The filling station of claim 3, further comprising a cooling unit comprising a plurality of coolers, and a cooling circuit for circulating the gas from the supply unit to the cooling unit, the cooling circuit comprising a network of cooling pipes connecting each supply device in the supply unit to each cooler in the cooling unit and at least one cooling distributor for selectively associating the supply devices and the coolers, the control device being further configured for controlling the cooling distributor.

5. The filling station of claim 2, further comprising a cooling unit comprising at least one cooler for reducing the temperature of the gas.

6. The filling station of claim 5, wherein the cooling unit comprises a plurality of coolers.

7. The filling station of claim 6, further comprising a cooling circuit for circulating the gas from the supply unit to the cooling unit, the cooling circuit comprising a network of cooling pipes connecting each supply device in the supply unit to each cooler in the cooling unit and at least one cooling distributor for selectively associating the supply devices and the coolers, the control device being further configured for controlling the cooling distributor.

8. The filling station of claim 6, further comprising a cooling circuit for circulating the gas from the storage unit to the cooling unit, the cooling circuit comprising a network of cooling pipes connecting each container in the storage unit to each cooler in the cooling unit and at least one cooling distributor for selectively associating the containers and the coolers, the control device being further configured for controlling the cooling distributor.

9. The filling station of claim 8, further comprising a supply circuit for circulating the gas from the storage unit to the supply unit, the supply circuit comprising a network of supply pipes connecting each container of the storage unit to each supply device of the supply unit and at least one supply distributor for selectively associating the coolers and the supply devices, the control device being further configured for controlling the supply distributor.

10. The filling station of claim 1, further comprising at least one gas supply unit, the at least one gas supply unit forming the source from which the gas originates.

11. The filling station of claim 10, wherein the supply unit comprises a plurality of gas supply units, the filling station comprising a compression circuit for circulating gas from the supply unit to the compression unit, the compression circuit comprising a network of compression pipes connecting each gas supply unit of the supply unit to each compressor of the compression unit and at least one compression distributor for selectively associating the gas supply units and the compressors, the control device being further configured for controlling the compression distributor.

12. The filling station of claim 11, wherein at least one gas supply unit of the supply unit is a stationary or mobile hydrogen production unit.

13. The filling station of claim 12, wherein the hydrogen production unit is an electrolyzer.

14. The filling station of claim 10, wherein at least one gas supply unit of the supply unit is a stationary or mobile hydrogen production unit.

15. The filling station of claim 14, wherein the hydrogen production unit is an electrolyzer.

16. The filling station of claim 10, wherein at least one gas supply unit of the supply unit is a mobile storage unit.

17. The filling station of claim 1, further comprising at least one other container separate from the plurality of containers of the storage unit, the at least one other container not being systematically connected to each compressor of the plurality of compressors of the compression unit.

18. The filling station of claim 1, further comprising at least one other compressor separate from the plurality of compressors of the compression unit, the at least one other compressor not being systematically connected to each container of the plurality of containers of the storage unit.

19. The filling station of claim 1, further comprising a cooling unit comprising at least one cooler for reducing the temperature of the gas.

20. The filling station of claim 19, wherein the cooling unit comprises a plurality of coolers.

* * * * *